United States Patent
Kneckt et al.

(10) Patent No.: US 10,430,734 B2
(45) Date of Patent: Oct. 1, 2019

(54) MANAGING OPERATION DURING ABSENCE IN WIRELESS NETWORK

(71) Applicant: Nokia Technologies Oy, Espoo (FI)

(72) Inventors: Jarkko Kneckt, Espoo (FI); Mika Kasslin, Espoo (FI); Janne Marin, Espoo (FI); Olli Alanen, Vantaa (FI); Enrico-Henrik Rantala, Iittala (FI)

(73) Assignee: Nokia Technologies Oy, Espoo (FI)

( * ) Notice: Subject to any disclaimer, the term of this patent is extended or adjusted under 35 U.S.C. 154(b) by 254 days.

(21) Appl. No.: 15/529,854

(22) PCT Filed: Nov. 27, 2014

(86) PCT No.: PCT/FI2014/050922
§ 371 (c)(1),
(2) Date: May 25, 2017

(87) PCT Pub. No.: WO2016/083659
PCT Pub. Date: Jun. 2, 2016

(65) Prior Publication Data
US 2018/0336499 A1 Nov. 22, 2018

(51) Int. Cl.
*H04W 52/02* (2009.01)
*G06Q 10/06* (2012.01)
*H04W 84/12* (2009.01)

(52) U.S. Cl.
CPC ........ *G06Q 10/06* (2013.01); *H04W 52/0216* (2013.01); *H04W 52/0235* (2013.01);
(Continued)

(58) Field of Classification Search
CPC ............. G06Q 10/06; H04W 52/0216; H04W 52/0235; H04W 52/0258; H04W 76/28;
(Continued)

(56) References Cited

U.S. PATENT DOCUMENTS

2011/0090877 A1 4/2011 Yuan
2011/0188391 A1* 8/2011 Sella .................... H04W 24/10
370/252

(Continued)

FOREIGN PATENT DOCUMENTS

WO WO-2008/097060 A2 8/2008

OTHER PUBLICATIONS

International Search Report of PCT/FI2014/050922, dated Mar. 20, 2015.

(Continued)

*Primary Examiner* — Nathan S Taylor
(74) *Attorney, Agent, or Firm* — Harrington & Smith

(57) ABSTRACT

This document discloses a solution where power management of devices of a wireless networks are controlled in connection with an absence period. According to an aspect, an apparatus determines at least one allowable power management mode for at least a second apparatus; causes transmission of a first frame indicating the at least one allowable power management mode; and causes transmission of an indication of an absence period during which it is not possible to transfer frames with the apparatus, wherein the indication is provided in at least one of the first frame and a second frame. The first frame configures at least the second apparatus to be ready to communicate with the apparatus at the end of the absence period in a case where the at least one allowable power management mode indicates a first power management mode.

20 Claims, 6 Drawing Sheets

(52) U.S. Cl.
CPC ........ *H04W 52/0258* (2013.01); *H04W 84/12* (2013.01); *Y02D 70/1242* (2018.01); *Y02D 70/1262* (2018.01); *Y02D 70/142* (2018.01); *Y02D 70/146* (2018.01); *Y02D 70/22* (2018.01)

(58) Field of Classification Search
CPC ............. H04W 84/12; H04W 52/0225; H04W 40/005; H04W 40/244; H04W 52/0206; H04W 52/0209; H04W 52/0229; H04W 52/0232; H04W 52/0274; H04W 72/1215; H04W 88/02; H04W 88/06; Y02D 70/1242; Y02D 70/1262; Y02D 70/142; Y02D 70/146; Y02D 70/22; Y02D 70/00; Y02D 70/1222; Y02D 70/144; Y02D 70/26; H04L 1/0003; H04L 49/201; H04L 5/22; H04L 69/22; H04L 69/323
USPC ........................................................ 455/418
See application file for complete search history.

(56) References Cited

U.S. PATENT DOCUMENTS

| | | | |
|---|---|---|---|
| 2012/0106381 A1 | 5/2012 | Vedantham et al. | |
| 2012/0195227 A1* | 8/2012 | Vedantham | H04W 52/0232 370/253 |
| 2013/0028156 A1 | 1/2013 | Vedantham et al. | |
| 2013/0124894 A1* | 5/2013 | Cho | H04W 52/0229 713/323 |
| 2013/0227152 A1* | 8/2013 | Lee | H04W 48/16 709/227 |
| 2013/0235720 A1* | 9/2013 | Wang | H04W 28/0278 370/229 |
| 2013/0238919 A1* | 9/2013 | Ponmudi | H04W 52/0216 713/323 |
| 2014/0032951 A1* | 1/2014 | Garg | H04W 52/0216 713/323 |
| 2014/0071870 A1* | 3/2014 | Abraham | H04W 52/0206 370/311 |
| 2014/0086134 A1 | 3/2014 | Smadi et al. | |
| 2014/0204814 A1* | 7/2014 | Ahmadvand | H04W 52/02 370/311 |
| 2014/0233467 A1* | 8/2014 | Vandwalle | H04W 72/12 370/329 |
| 2014/0254565 A1* | 9/2014 | Pitchaiah | H04L 5/22 370/336 |
| 2014/0321349 A1* | 10/2014 | Seok | H04W 74/08 370/311 |
| 2015/0024687 A1* | 1/2015 | Rawat | H04W 88/06 455/41.2 |
| 2015/0319235 A1* | 11/2015 | Liu | H04L 29/08072 709/204 |
| 2015/0358905 A1* | 12/2015 | Ding | H04W 52/0219 370/311 |
| 2015/0373642 A1* | 12/2015 | Wong | H04L 1/0003 370/311 |
| 2016/0095062 A1* | 3/2016 | Rabii | H04W 52/0229 370/311 |
| 2016/0302026 A1* | 10/2016 | Lee | H04W 76/14 |
| 2016/0359325 A1* | 12/2016 | Kawata | G16H 40/67 |
| 2016/0373914 A1* | 12/2016 | Lee | H04W 8/005 |
| 2017/0195959 A1* | 7/2017 | Park | H04W 84/12 |

OTHER PUBLICATIONS

Jung et al., Designing content-centric multi-hop networking over Wi-Fi Direct on smartphones, 2014 IEEE Wireless Communications and Networking Conference (WCNC), Apr. 6, 2014, entire document.
Tsao et al, A Survey of Energy Efficient MAC Protocols for IEEE 802.11 WLAN, Computer Communications, Jan. 15, 2011, entire document.
Jan. 1, 2010—Wi-fi peer-to-peer (P2P) technical specification—Version 1.1, pp. 1-159, XP009163866.
Jun. 7, 2018—(EP) European Search Report—App. 14906974.2.

* cited by examiner

MANAGING OPERATION DURING ABSENCE IN WIRELESS NETWORK

FIELD

The invention relates to the field of wireless networks and, particularly, to managing operation in a wireless network during an absence period.

BACKGROUND

In some wireless networks, a controller of a wireless network may be allowed to be absent from the wireless network. The absence may be a result of the controller operating in another wireless network. The controller may indicate an absence period by transmitting a notice-of-absence message in the wireless network.

BRIEF DESCRIPTION

Some aspects of the invention are defined by the independent claims.

Embodiments of the invention are defined in the dependent claims.

LIST OF DRAWINGS

Embodiments of the present invention are described below, by way of example only, with reference to the accompanying drawings, in which FIG. 1 illustrates a wireless communication scenario to which embodiments of the invention may be applied;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
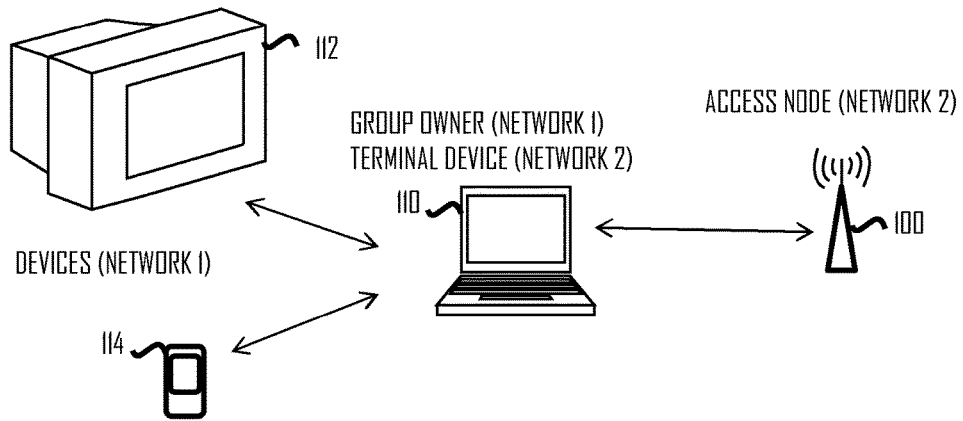

A wireless communication scenario to which embodiments of the invention may be applied is illustrated in FIG. 1. FIG. 1 illustrates wireless communication devices comprising an access point (AP) 100 and a plurality of terminal devices (STA) 110, 112, 114. The AP 100 may be a stationary access point or a mobile access point. A general term used in this specification and encompassing both the APs and STAs is a wireless device. The access point may refer to an access point specified in IEEE 802.11 specifications or to a base station of another wireless access network. The mobile access point may have a functionality of a STA as well. A common term encompassing both the stationary APs and mobile APs is an access node. An access node may provide or be comprised in a basic service set (BSS) which is a basic building block of a wireless local area network (WLAN). Each access node may represent a different BSS. A single access node may, however, establish a plurality of BSSs. The most common BSS type is an infrastructure BSS that includes a single access node together with all STAs associated with the access node. The access node may provide access to other networks, e.g. the Internet. In another embodiment, the BSSs may be connected with each other by a distribution system (DS) to form an extended service set (ESS). An independent BSS (IBSS) is formed by an ad hoc network of terminal devices without a stationary controlling AP. In a context where two BSSs have overlapping coverage areas, one BSS may be considered as an overlapping BSS (OBSS) from the viewpoint of the other BSS. While embodiments of the invention are described in the context of the above-described topologies of IEEE 802.11, it should be appreciated that these or other embodiments of the invention may be applicable to wireless networks based on other specifications, e.g. WiMAX (Worldwide Interoperability for Microwave Access), UMTS LTE (Long-term Evolution for Universal Mobile Telecommunication System), mobile ad hoc networks (MANET), mesh networks, and other networks having cognitive radio features, e.g. transmission medium sensing features and adaptive capability to coexist with radio access networks based on different specifications and/or standards. Some embodiments may be applicable to networks having features under development by other IEEE task groups. Therefore, the following description may be generalized to other systems as well.

The different access nodes may operate at least partly on different channels, e.g. on different frequency channels. IEEE 802.11n specification specifies a data transmission mode that includes 20 megahertz (MHz) wide primary and secondary channels. The primary channel is used in all data transmissions with clients supporting only the 20 MHz mode and with clients supporting higher bandwidths. A further definition in 802.11n is that the primary and secondary channels are adjacent. The 802.11n specification also defines a mode in which a STA may, in addition to the primary channel, occupy one secondary channel which results in a maximum bandwidth of 40 MHz. IEEE 802.11ac specification extends such an operation model to provide for wider bandwidths by increasing the number of secondary channels from 1 up to 7, thus resulting in bandwidths of 20 MHz, 40 MHz, 80 MHz, and 160 MHz. A 40 MHz transmission band may be formed by two contiguous 20 MHz bands, and an 80 MHz transmission band may be formed by two contiguous 40 MHz bands. However, a 160 MHz band may be formed by two contiguous or non-contiguous 80 MHz bands. Different BSSs may employ different primary channels.

As mentioned above, the transmission band of a BSS contains the primary channel and zero or more secondary channels. The secondary channels may be used to increase data transfer capacity of a transmission opportunity (TXOP). The secondary channels may be called a secondary channel, a tertiary channel, a quaternary channel, etc. However, let us for the sake of simplicity use the secondary channel as the common term to refer also to the tertiary or quaternary channel, etc. The primary channel may be used for channel contention, and a TXOP may be gained after successful channel contention on the primary channel. Some IEEE 802.11 networks are based on carrier sense multiple access with collision avoidance (CSMA/CA) for channel access. Some networks may employ enhanced distributed channel access (EDCA) which provides quality-of-service (QoS) enhancements to medium access control (MAC) layer. The QoS enhancements may be realized by providing a plurality of access categories (AC) for prioritizing frame transmissions. The access categories may comprise the following priority levels in the order of increasing priority: background (AC_BK), best effort (AC_BE), video streaming (AC_VI), and voice (AC_VO). A higher priority frame transmission may use a shorter contention window and a shorter arbitration inter-frame spacing (AIFS) that result in higher probability of gaining the TXOP. Furthermore, some networks may employ restricted access windows (RAW) where a reduced set of wireless devices of the wireless network may carry out channel contention. The access node may define the RAW and a group of wireless devices that are allowed to attempt the channel access within the RAW. Grouping allows partitioning of the wireless devices into groups and restricting channel access only to wireless devices belonging to a specified group at any given time period. The time period may be enabled by allocating slot duration and a number of slots in RAW access. The grouping may help to reduce contention by restricting access to the medium only to a subset of the wireless devices. The grouping may also reduce the signalling overhead.

As described above, the BSS may be represented by the access node and one or more terminal devices connected to the access node. In the example of FIG. 1, the access node 100 and a device 110 operating as the terminal device may be comprised in the first BSS and, thus, in the same wireless network. In addition to operating in the first BSS as the terminal device, the device 110 may operate in another wireless network. Task group ax (TGax, also known as high-efficiency WLAN task group) within IEEE 802.11 is defining the next evolution to the physical layer and the medium access control layer of the wireless local area networks. FIG. 1 illustrates one scenario applicable to the next evolution where the device 110, in addition to the conventional operation in the first BSS, may establish device-to-device connections in the other wireless network. The device may operate as group owner (GO) in the other wireless network. The group owner may be a device with similar capabilities as an access node and, additionally, further capabilities. For example, the group owner is allowed to be absent to associated clients (formally called peer-to-peer, P2P, clients) in the other wireless network. During the absence, the group owner may, for instance, operate in a doze state or operate in the first BSS. Such operation may be made within the specifications of Wi-Fi Direct specified within the Wi-Fi Alliance. Wi-Fi Direct is also called Wi-Fi P2P. Such additional capabilities of the group owner may, however, be available only when all clients currently associated to the group owner are Wi-Fi Direct compatible (i.e. P2P clients). Some embodiments of the invention are applicable to the WLAN that may be an IEEE 802.11-based network, a Wi-Fi Direct group or network, or a kind.

The group owner may indicate an absence period beforehand. In one example, the group owner is always present during beacon transmission and during a time interval representing the length of a contention window (CWTime), which may be at least 10 time units of the wireless network and measured from the transmission timing of the beacon. In another example, the group owner may use a notice-of-absence mechanism. The notice-of-absence mechanism may establish a periodically repeating period when the group owner is absent, or the absence may be one-time operation such that the group owner indicates in a notice-of-absence frame a time period measured from the frame during which group owner is absent.

During the absent periods, the group owner or the associated devices may not be responsible to receive any frames from each other, they need not to acknowledge the received frames, and shall not transmit any frames. Referring to FIG. 1 where the device 110 represents a computer or a laptop computer that operates as the group owner, the associated devices 112, 114 may comprise peripheral devices 112 of the computer or other devices such as portable or mobile devices 114. The peripheral devices may comprise a wireless keyboard or a display unit 112 communicating with the computer 110 wirelessly. The mobile device 114 may be a cellular phone, for example.

The connection establishment in the network operated by the access node 100 and the network operated by the group owner 110 may include authentication in which an identity of the terminal device is established in the access node or group owner. The authentication may comprise exchanging an encryption key used in the BSS. After the authentication, the access node or the group owner and the terminal device may carry out association in which the terminal device is fully registered in the BSS, e.g. by providing the terminal device with an association identifier (AID). It should be noted that in other systems terms authentication and association are not necessarily used and, therefore, the association of the terminal device to an access node or the group owner should be understood broadly as establishing a connection between the terminal device and the access node or the group owner such that the terminal device is in a connected state with respect to the access node or the group owner and scanning for downlink frame transmissions from the access node or the group owner and its own buffers for uplink frame transmissions.

In a conventional 802.11 network, a wireless device initiating a TXOP may transmit a frame that triggers a network allocation vector (NAV). The frame may be a control frame such as a request-to-send (RTS) frame or a data frame. The frame may comprise a Duration field defining the duration of the NAV. Any other wireless device detecting the frame and extracting the Duration field suspends access to the same channel for the duration of the NAV. This mechanism may reduce simultaneous transmissions in the proximity that may be renamed as collisions. In some collisions the receiver cannot receive transmissions resulting to wasted transmission resources. The 802.11 networks may employ another collision avoidance mechanism called clear-channel assessment (CCA). A wireless device trying to access the channel scans for the channel before the access. If the channel is sensed to contain radio energy that exceeds a CCA threshold, the wireless device refrains from accessing the channel. If the channel is sensed to be free and no NAV is currently valid, the wireless device may access the channel. A conventional value for the CCA threshold may be −82 decibel-milliwatts (dBm) or −62 dBm depending on a channel access scheme, for example.

The wireless devices 110, 112, 114 may employ a randomized back-off time defining a minimum time interval they refrain from frame transmissions after detecting that the channel is busy. During the channel sensing, the back-off time may be decremented while the channel is sensed to be idle or available for the channel access. When the back-off time reduces to zero and the channel is still sensed to be idle, the wireless device may carry out the frame transmission. The back-off time value may be maintained for the duration the channel is sensed to be busy and, in some systems, for a determined guard time interval (e.g. the AIFS) after the detection that the channel has become idle.

Referring back to FIG. 1, the devices 110, 112, 114 may employ power management modes specified in the specifications of wireless local area networks such as unscheduled automatic power-save delivery (U-APSD). In the U-APSD, the devices 110 to 114 operating as the terminal devices or the P2P clients may stay in a power-saving state such as a doze state and trigger a service period by transmitting a frame to the access node or the group owner. In the scenario of FIG. 1 where the device 110 may be absent from the second wireless network, this may cause inefficiency when the absence period ends and the device 110 returns to the second wireless network. If the devices 112, 114 are in the power-save state at that time, the group owner 110 cannot carry out frame transmissions and it has to wait until the devices 112, 114 transmit a frame to the group owner and, thus, trigger the service period.

Figure 2:
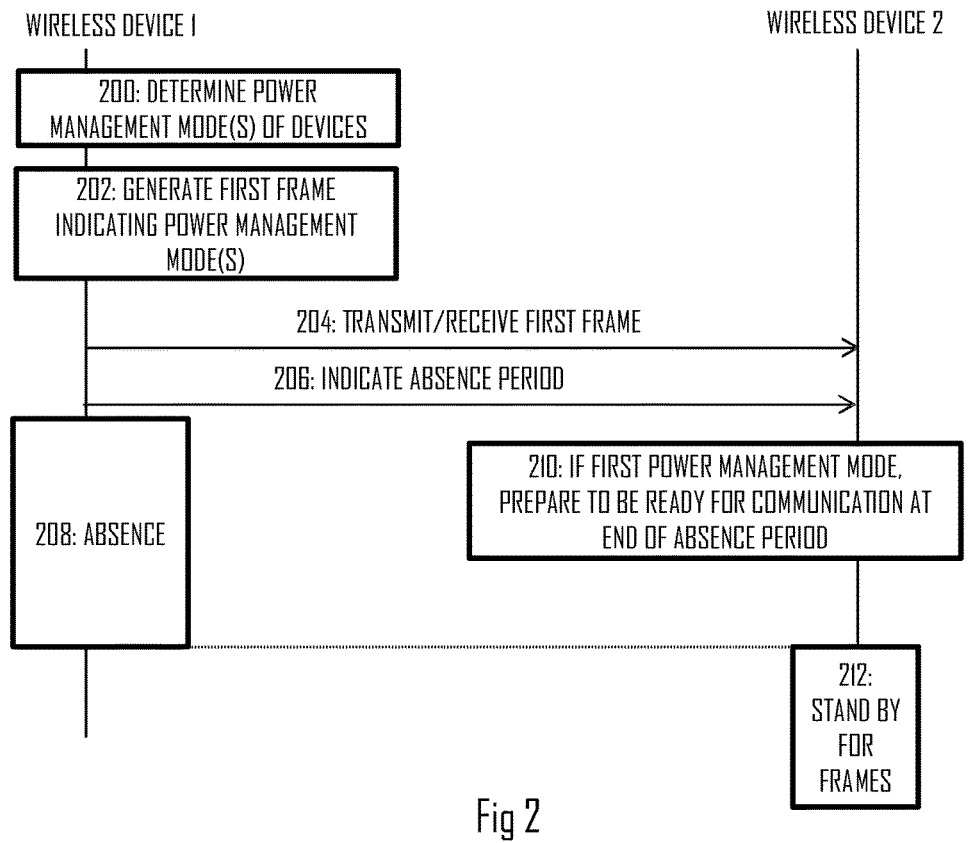
FIG. 2 illustrates a process for configuring operation of wireless devices during an absence period according to an embodiment of the invention.

FIG. 2 illustrates an embodiment where the devices of the wireless network controlled by the group owner are configured to be ready for frame transmissions at the end of the absence period. FIG. 2 illustrates a signalling diagram between a first wireless device and a second wireless device, wherein the first wireless device may be the group owner 110 and the second wireless device may be a client device, e.g. one of the devices 112, 114. Referring to FIG. 2, the procedure comprises obtaining, in the first wireless device in block 200, information on at least one allowable power management mode for at least the second wireless device. Block 200 may comprise determining the at least one allowable power management mode on the basis of defined rules, or it may comprise acquiring the at least one allowable power management mode from another device or from a memory. In block 202, the first wireless device generates a first frame comprising an information element that indicates the determined power management mode(s). In step 204, the first wireless device causes transmission of the first frame to the second wireless device, and the second wireless device receives the first frame in step 204.

In step 206, the first wireless device causes transmission of an indication of an absence period during which it is not possible to transfer frames with the first wireless device. As described above, the indication may indicate a periodic absence that repeats with a periodicity specified by the indication, or the indication may indicate a one-time absence starting from the transmission of the indication and lasting for a time interval specified by the indication. The indication may be provided in the first frame (steps 204 and 206 may then be combined) or in a separate frame. The second wireless device receives the indication in step 206. After transmitting the indication, the first wireless device may cease operation in the wireless network for the indicated absence period, e.g. it may doze or switch to operate in another wireless network. The absence period is denoted by numeral 208 in FIG. 2.

In case the at least one allowable power management mode indicated in the first frame is a first power management mode, the first frame configures the second wireless apparatus to be ready to communicate with the first apparatus at the end of the absence period and/or immediately after the absence period ends. Upon detecting the first power management mode from the first frame, the second wireless device assumes the first power management mode during the absence period and configures its operation such that it is ready to communicate with the first wireless device at the end of the absence period (block 210). As a result, when the absence period 208 ends, the second wireless device may be configured to be ready to receive frames from the first wireless device (block 212) or initiate a frame transmission to the first wireless device.

An advantage of this embodiment is that the group owner (the first wireless device) may determine whether or not it wants the client devices of the wireless network to be ready for frame transmissions when the absence period ends. As a consequence, unwanted delays caused by dozing client devices may be reduced. For example, in IEEE 802.11 specifications the terminal devices are assumed to make autonomous selection on used power management mode. The idea that another device commands the terminal device to restrict to a subset of the power management modes is thus a novel approach in such wireless networks. As described above, the subset may comprise one or more power management modes.

In an embodiment, the allowable power management modes indicated by the group owner may be applied only to the absence periods, and further power management mode(s) may be allowed outside the absence periods. In other words, the group owner may limit the number of available power management modes inside the absence periods with respect to the total number of power management modes or the number of allowed power management modes outside the absence periods. The power management of the group owner itself may also be limited to the same allowable power management mode(s) as the client devices, or the group owner may select, during the absence period, a power management mode not allowed to the client device during the absence period.

In an embodiment, the indication of step 202 specifies explicitly said at least one allowable power management mode. In another embodiment, the indication of step 202 comprises at least one requirement for the at least one allowable power management mode. In such an embodiment where the at least one allowable power management mode is indicated in an implicit manner, the second wireless device may determine the at least one allowable power management mode based on the at least one requirement and, in some embodiments, based on further requirements or inputs. In an embodiment, the allowed power management mode(s) comprises an unscheduled automatic power-save delivery (U-APSD) mode of the 802.11 networks. In such a case, block 212 may be replaced by a block in which the client device transmits a trigger frame to the group owner to initiate a service period in which frame transmissions may be carried out between the group owner and the client device.

Figure 3:
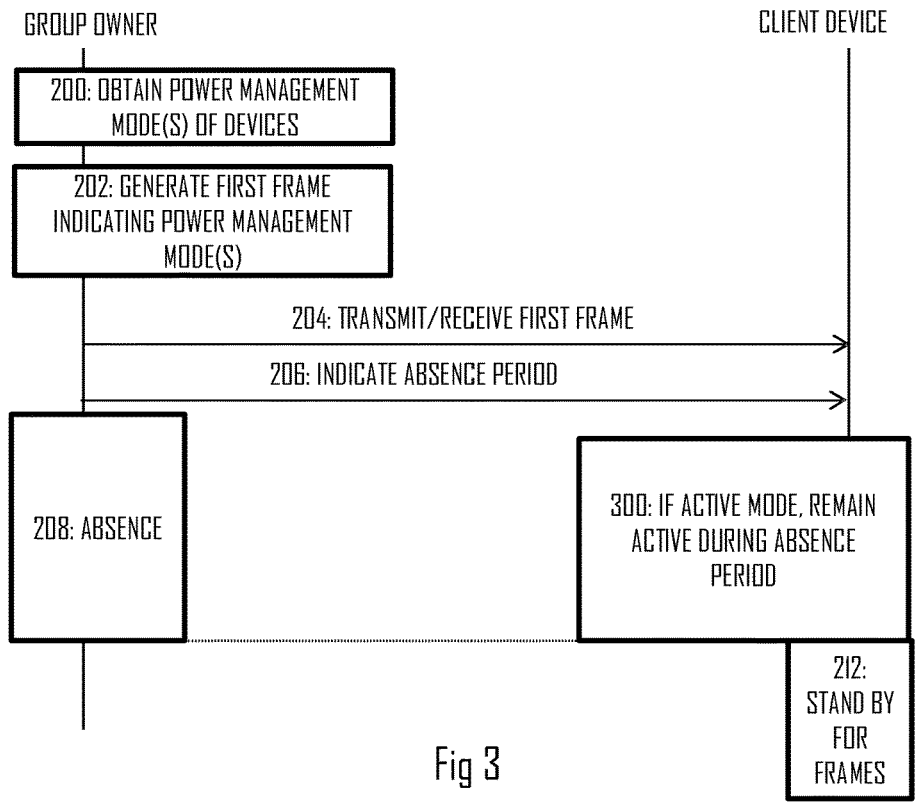
FIGS. 3 and 4 illustrate operation of client devices during an absence period of a group owner of a wireless network according to some embodiments of the invention.
Figure 4:
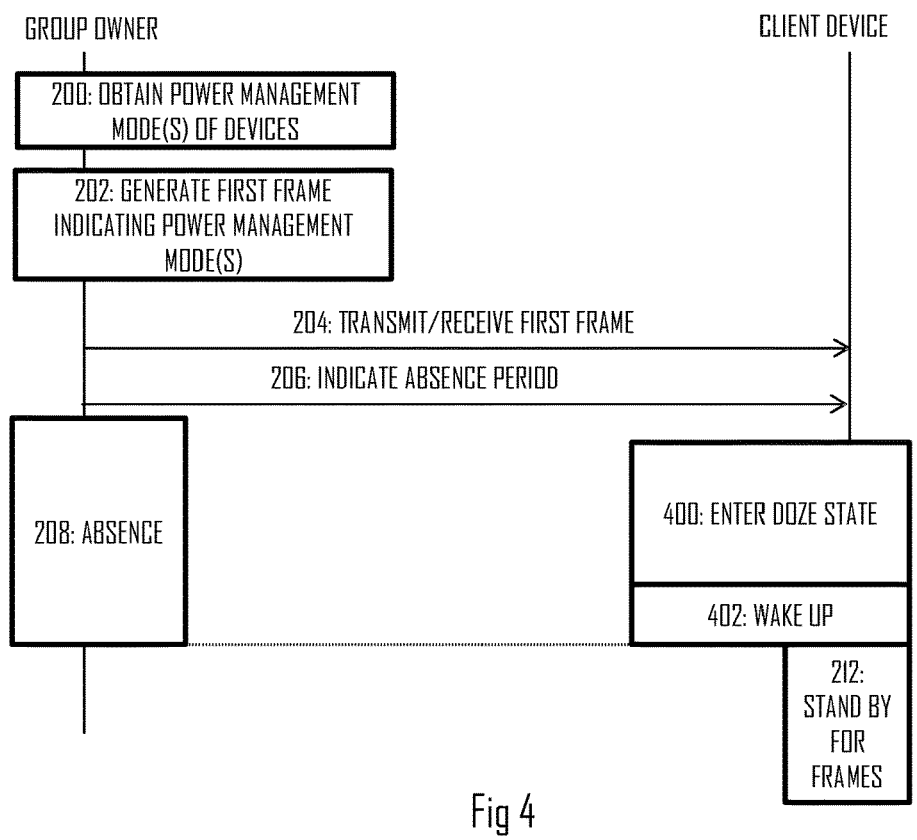

FIGS. 3 and 4 illustrate some embodiments of the first power management mode. In the embodiment of FIG. 3, the first power management mode is an active mode in which the client device(s) is/are configured to stay in an active state for the duration of the absence period (block 300). In other words, upon detecting from the first frame that the allowable power management mode is the active mode, the client device may suspend dozing for the duration of the absence period 208 and, accordingly, remain in an active state and ready for frame transmissions for the duration of the absence period and also at the end of the absence period. By preventing the dozing completely, the group owner may ensure that the client devices are available for frame transmissions during the absence period. In this manner, the group owner may transmit frames to the client devices even during the absence period which it may be able to do if, as an example, the group owner becomes available for the client communication before the end of the absence period. Additionally, an unexpected delay resulting switching the client device from the doze state to the active state at the end of the absence period will not cause unexpected unavailability of the client device, because the client device never dozes during the absence period 208.

FIG. 4 illustrates an embodiment where the first power management mode allows the client device to make an autonomous decision of whether or not to doze during the absence period. In this embodiment, the at least one allowable power management mode may comprise a power-save mode. However, the first power management mode may configure the client device to be ready for frame transmissions at the end of the absence period. In other words, upon detecting from the first frame that the allowable power management mode allows the dozing, the client device may determine whether or not to doze during the absence period 208. The client device may suspend dozing for the duration of the absence period 208, as in FIG. 3, or it may determine to enter a doze state (block 400). Upon choosing to doze, the client device may start a wake-up procedure (block 402) before the absence period 208 ends so that the client device is ready for frame transmissions at the end of the absence period 208. The timing of the execution of block 402 may be determined on the basis of the time needed by the client device to transit from the doze state to the active state. Additional guard time may be employed to ensure that unexpected events will not cause the client device to be unable for frame communication at the end of the absence period.

In yet another embodiment, the client device may be allowed to enter the doze state even if the allowed power management mode indicated in the first frame is the active mode, e.g. the Active Mode of the 802.11 specifications. In this case, the client device may be configured with a capability of making a decision of whether or not to enter a doze state during the absence period 208 regardless of the at least one allowable power management mode.

In an embodiment, the first frame may indicate more than one allowed power management mode. In such a case, the client device may choose one of the allowed power management modes according to a determined criterion. For example, if the client device is powered by the mains, e.g. the display unit 112, it may choose to operate in the active mode. On the other hand, hand a battery-operated device 114 may choose a power management mode that allows dozing. However, the battery-operated device 114 may choose the active mode in case it transfers high priority data traffic such as real-time data traffic (voice, video streaming).

In an embodiment where the wireless network of the group owner comprises a plurality of client devices, the group owner may determine the allowable power management mode(s) for each client device separately and configure each client device separately. In such a case, the first frame may be a unicast frame, e.g. a probe response frame, an association response frame or an action frame. In another embodiment, the group owner may collectively configure a plurality of client devices or even all the client devices of the wireless network. In such a case, the first frame may be a multicast frame or a broadcast frame, e.g. a beacon frame, a measurement pilot frame or a FILS (fast initial link setup) frame.

In an embodiment, the notice-of-absence may be transmitted in a group-addressed frame such as a broadcast frame or a multicast frame. The notice-of-absence indicating a one-time notice of absence may be transmitted as the last frame of the last TXOP before the absence period 208. In this manner, the notice-of-absence frame does not consume additional communication time after the TXOP.

Figure 5:
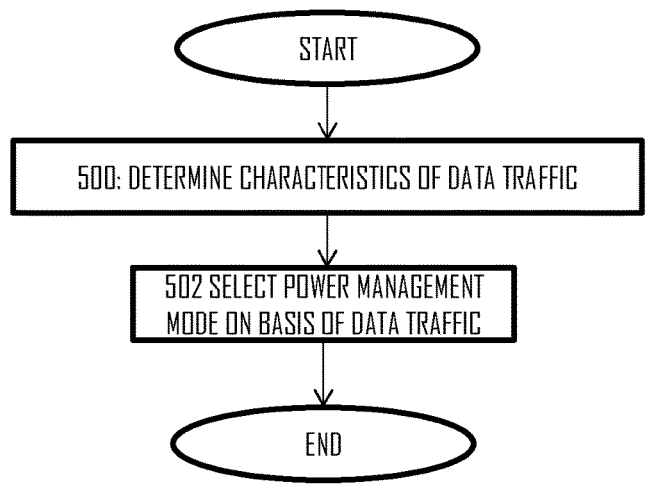
FIGS. 5 and 6 illustrate embodiments for selecting a power management mode to be applied during absence periods.
Figure 6:
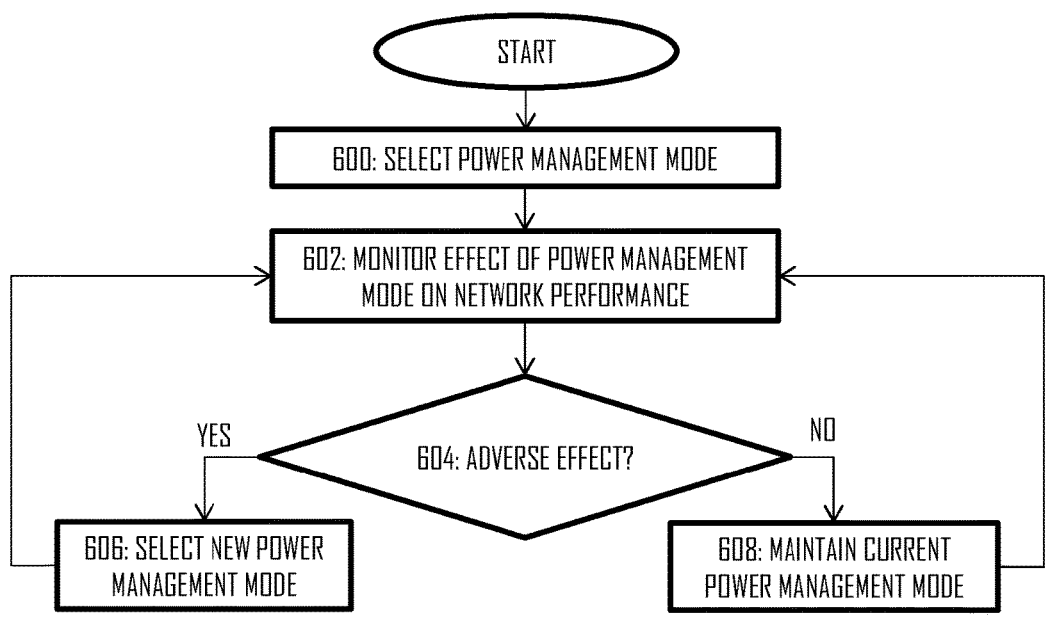

Let us now describe some embodiments for the group owner to select the allowable power management mode(s). FIGS. 5 and 6 illustrate such embodiments. Referring to FIG. 5, the group owner may select the power management mode of the client device on the basis of the data traffic transferred with the client device. In block 500, the group owner may determine characteristics of the data traffic. Block 500 may comprise determining the access category of the data traffic transferred between the client device and the group owner. If the application does not require real time data delivery (AC_BE or AC_BK), the group owner may select in block 502 a power management mode that allows dozing. The power management mode may allow the client device to make an autonomous decision of the dozing, e.g. the power management mode may allow the client device to doze at the end of the absence period. If the application requires real time data delivery (AC_VO or AC_VI), the group owner may select in block 502 a power management mode that prevents dozing during the absence period or allows dozing but causes the client device to wake up before the absence period ends. Block 500 may comprise determining the amount of transmission time consumed by the data traffic. If the traffic consumes less than a determined amount of the total transmission time, the group owner may select in block 502 a power management mode that allows dozing. The power management mode may then allow the client device to make an autonomous decision of the dozing, e.g. the power management mode may allow the client device to doze at the end of the absence period. If the traffic consumes more than the determined amount of the total transmission time, the group owner may select in block 502 a power management mode that prevents dozing during the absence period or allows dozing but causes the client device to wake up before the absence period ends. The determined amount may be 20% of the total transmission time, for example, or another determined percentage or value. In another embodiment, block 500 may comprise determining a bit rate or a maximum delay of the data traffic. If the bit rate is higher than a determined threshold, the group owner may select a power management mode that causes the client device to be ready for frame transmissions at the end of the absence period. If the bit rate is lower than the threshold, the group owner may allow the client device to make an autonomous decision about the power management mode. If the maximum delay is lower than a determined threshold, the group owner may select a power management mode that causes the client device to be ready for frame transmissions at the end of the absence period. If the maximum delay is higher than the threshold, the group owner may allow the client device to make an autonomous decision about the power management mode.

In an embodiment, the group owner may select a power management mode on the basis of its own capabilities or current operational parameters. For example, if the group owner is mains-powered and does not need to concurrently operate in another wireless network, the group owner may select the allowable power management modes that allow the client devices to operate in any power save mode and assume that the clients are capable to optimize their power save features as they see appropriate, e.g. according to the offered traffic type, load and link performance.

In an embodiment, the client device may have also means to indicate its capabilities and/or status to the group owner, and the group owner may select the allowable power management mode(s) on the basis of the capabilities and/or status. The capabilities reported by the client device may comprise information on a size or a status of a transmit frame buffer of the client device. The client device may indicate the capability information to the group owner when requesting association to the group owner, in which case the capability information may be carried in an association request frame. In another example, the client device may indicate the capability while being associated to the group owner. In this case, the capability information may be transferred in a dedicated frame, e.g. a new action frame. The frame could be also used to carry information about the above-mentioned traffic characteristics such as at least one of the access category, frame rate, delay and jitter requirements. A dedicated frame, e.g. a new action frame, an association request frame may be used to carry information about the device status.

In the embodiment of FIG. 6, the group owner determines an effect of the absence period on performance of the wireless network and/or connections to individual client devices and selects the at least one allowable power management mode on the basis of the determined effect of the absence period. Referring to FIG. 6, the group owner may select the allowable power management mode(s) in block 600. Upon transmitting the first frame, the group owner may start monitoring the effect of the allowed power management mode(s) on the performance of the wireless network (block 602) and/or connections to individual client devices. Block 602 may comprise monitoring the number of overhead packets, e.g. null packets, that trigger or terminate service periods, monitoring additional delay and wasted transmission time consumed when the group owner waits for the trigger packets from the client device(s), monitoring an additional delay of the transmitted packets when the group owner obtains a frame to be transmitted to the client device after it has terminated the service period. If the group owner determines in block 604 that the effect of the current power management mode(s) is adverse on the network performance and/or performance of connections to individual client devices, the process may proceed to block 606 in which the group owner selects a new one or more power management modes. If the network performance and/or performance of connections to individual client devices is acceptable, the group owner may maintain the current one or more allowable power management modes (block 608).

In an embodiment where the selected power management mode allows dozing, if the measured overhead, additional delay or wasted transmission resources is determined to be high, e.g. above a determined threshold, the group owner may select the new power management mode that forces the client device(s) to stay in the active state and not doze.

Figure 7:
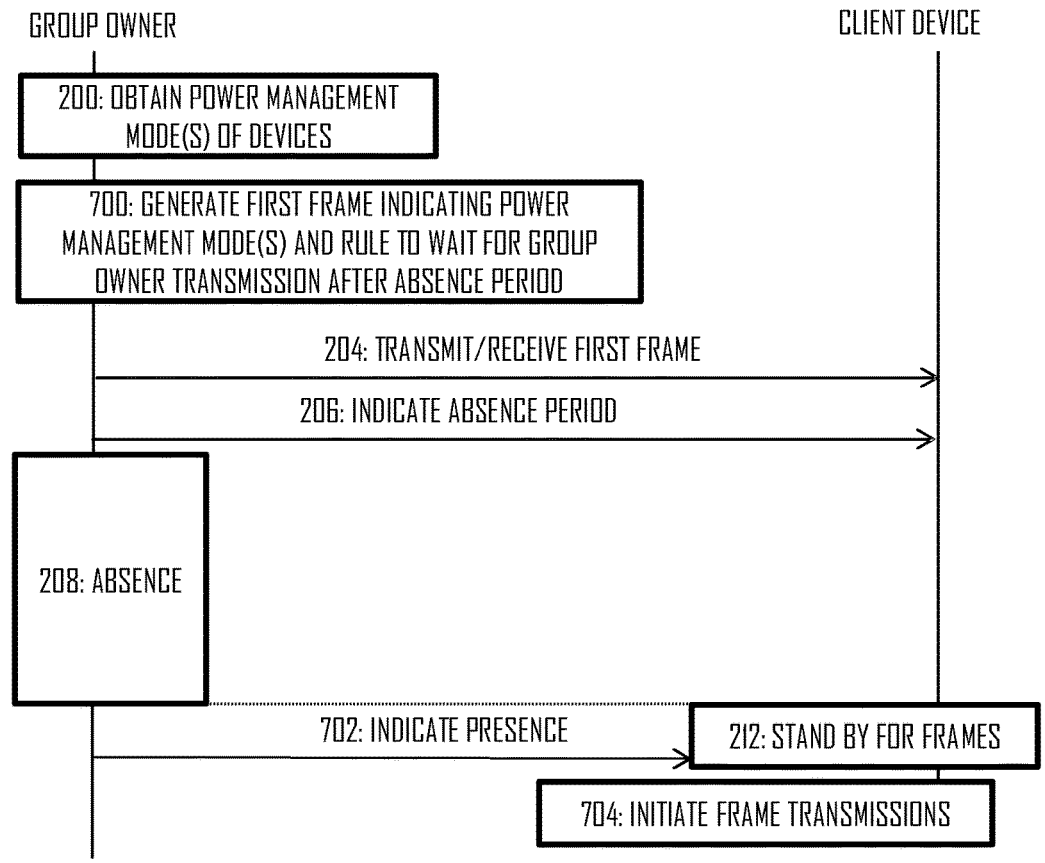
FIGS. 7 and 8 illustrate embodiments for triggering frame transmissions after the absence period has ended.

The client devices may assume that the group owner is available for frame transmissions after the absence period has ended. In reality, there may be situations where the group owner is still operating in the other wireless network or is performing switching between the wireless networks. This may in some cases lead to a situation where the client device may assume that the association has been disconnected and the client device switches to another wireless network. Therefore, it may be advantageous that the group owner sends a notification when it has become available to operate after the absence period 208. Such a notification may be transmitted by the group owner in a broadcast frame, multicast frame, or a unicast frame. FIG. 7 illustrates such a mechanism.

Referring to FIG. 7, the group owner may configure the client devices to wait for the indication of the presence from the group owner after the absence period ends (block 700). The configuration may be signalled to the client devices in the first frame or in another frame. The frame carrying the indication of the absence period in step 206 may also carry a field or an information element that instructs the client device(s) to start frame transmissions only upon reception of the notification of the availability from the group owner. The notification may be considered as being comprised in a trigger frame that triggers the frame transmissions after the absence period 208. After the absence period 208 has ended and the group owner has returned to the channel(s) of the wireless network, the group owner may transmit the trigger frame indicating the presence of the group owner in the wireless network (step 702). Upon receiving the trigger frame in step 702, the client device(s) may initiate frame transmissions with the group owner (block 704). Block 704 may comprise contention for channel access according to the 802.11 specifications.

Figure 8:
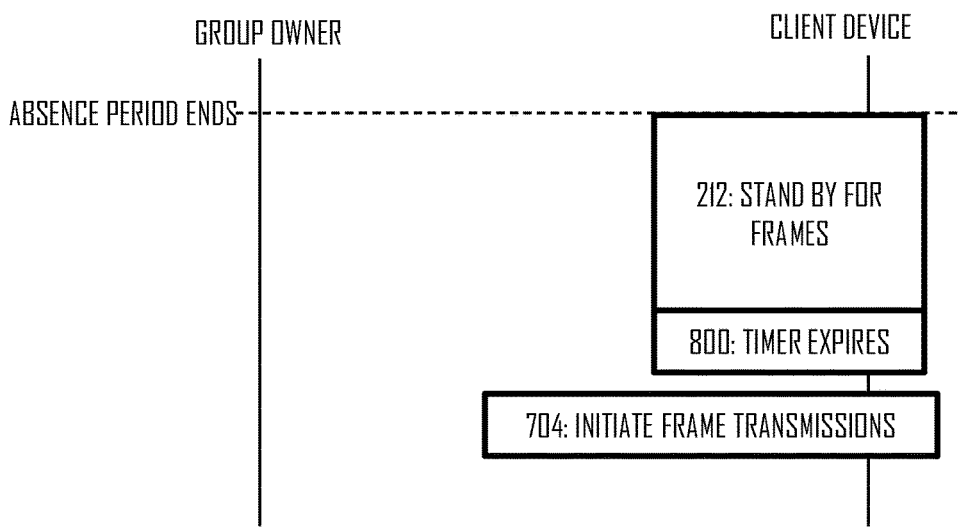

In an embodiment, the group owner may configure in block 700 a timer counted from the end of the absence period and specifying a time interval for how long the client devices have to wait for the trigger frame from the group owner. FIG. 8 illustrates the operation of the client device in such an embodiment. When the absence period ends, the client device may start the timer counting the time interval and, while the timer is running, scan for the trigger frame from the group owner in block 212. When the time expires in block 800 indicating the end of the time interval, the client device may initiate the frame transmissions in block 704, e.g. by starting the channel contention.

If a device needs to operate in multiple networks, for instance as a client in one or more infrastructure networks and as a GO in one or more Wi-Fi Direct networks, the device may need to schedule the operation in the networks, especially if the networks have different primary channel.

When the device 110 operates in multiple networks concurrently, it may use the U-APSD power management mode to limit the operation in the wireless network of the access node 100. The group owner may use the one-time notice-of-absence indication which enables the group owner to tune the length of the period and select the length of the absence periods more flexibly. If the operation durations in the wireless network of the access node 100 are very systematic, the group owner may use the periodic absence period. To set the duration of the one-time notice-of-absence indication correctly, the device may consider at least some of the following characteristics: delay that is acceptable for the traffic transmitted with the devices 112, 114 (the delay requirements may be used to define the maximum duration of the absence period 208), the time when the group owner has a relevant amount of data to be transmitted to the devices 112, 114 and/or to the access node 100 (big transmissions amounts enable longer TXOPs and/or larger data packets and, thus, reduce transmission overheads; the data amounts may be used to define the minimum duration of the absence period), the time required to operate in the network of the access node. For instance, when the device 110 operates as the terminal device in the network of the access node 100, the time when service period is initiated and the duration of the service period cannot be coordinated precisely. The device 110 may estimate the duration to transmit the traffic as precisely as possible on the basis of previous experiences, for example, and allocate the duration of the absence period accordingly. Accurate estimates enable the associated client devices 112, 114 to maximize their dozing time, when the dozing is allowed. The group owner may further take into the account duration of time it takes to switch to between the channels of the wireless networks. The duration has effect on both how much time is there to operate on each channel, but also how frequently it is feasible to switch the channel.

Figure 9:
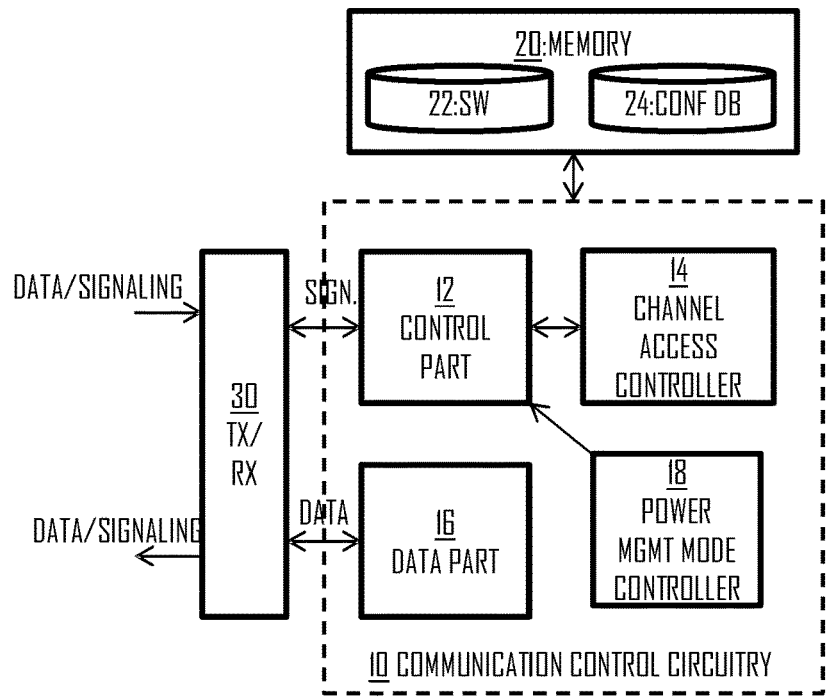
FIGS. 9 and 10 illustrate block diagrams of apparatuses according to some embodiments of the invention.

FIG. 9 illustrates an embodiment of an apparatus comprising means for carrying out the above-mentioned functionalities of the wireless device, e.g. the group owner. The group owner may be a device with capability of operating as the terminal device and capability of providing access node functions. The wireless device may comply with specifications of an IEEE 802.11 network and/or another wireless network, e.g. according to the Wi-Fi Direct specifications. The wireless device may also be a cognitive radio apparatus capable of adapting its operation to a changing radio environment, e.g. to changes in parameters of another system on the same frequency band. The wireless device may be or may be comprised in a computer (PC), a laptop, a tablet computer, a cellular phone, a palm computer, or any other apparatus provided with radio communication capability. In another embodiment, the apparatus carrying out the above-described functionalities of the wireless device is comprised in such a wireless device, e.g. the apparatus may comprise a circuitry, e.g. a chip, a chipset, a processor, a micro controller, or a combination of such circuitries in the wireless device.

Referring to FIG. 9, the apparatus may comprise a communication controller circuitry 10 configured to control wireless communications in the wireless device. The communication controller circuitry 10 may configure the establishment, operation, and termination of connections or associations in the apparatus, as described above. The communication controller circuitry 10 may comprise a control part 12 handling control signalling communication with respect to transmission, reception, and extraction of control or management frames including beacon messages, request messages, response messages, scanning or probing messages, request-to-send (RTS) messages, and clear-to-send (CTS) messages, broadcast messages, multicast messages, and unicast messages. The control part 12 may also carry out processing of headers of data frames. The communication controller circuitry 10 may further comprise a data part 16 that handles transmission and reception of payload data when the apparatus is associated to one or more other wireless devices.

The communication control circuitry 10 may further comprise a channel access controller 14 configured to control the channel access of the apparatus. The channel access controller 14 may, for example, select the wireless networks in which the apparatus operates and control switching between at least two wireless networks. Let us assume the scenario of FIG. 1, wherein the apparatus is the device 110. The channel access controller 14 may determine when the device 110 operates as the terminal device in the network of the access node 100 and when as the group owner in the network of the devices 112, 114. Upon determining to switch from the network of the devices 112, 114 to the network of the access node 100, the channel access controller 14 may initiate a process for indicating the absence to the devices 112, 114. The process may comprise the channel access controller 14 configuring the control part 12 to transmit the notice-of-absence frame according to any one of the above-described embodiments.

The communication control circuitry 10 may further comprise a power management mode controller 18 configured to select one or more allowable power management modes for the devices 112, 114 and to configure the control part 12 to transmit the first frame indicating the power management mode(s) to the devices according to any one of the above-described embodiments. The power management mode controller 18 may also implement the process of FIG. 6.

The circuitries 12 to 18 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 18 or all of them.

The apparatus may further comprise a memory 20 that stores computer programs (software) 22 configuring the apparatus to perform the above-described functionalities of the wireless device. The memory 20 may also store communication parameters and other information needed for the wireless communications. The memory 20 may store a configuration database 24 storing configuration parameters of wireless networks in which the wireless device operates. The configuration database may store, for example, rules for selecting the allowable power management modes during the absence periods.

The apparatus may further comprise radio interface components 30 providing the apparatus with radio communication capabilities within one or more wireless networks. The radio interface components 30 may comprise standard well-known components such as an amplifier, filter, frequency-converter, (de)modulator, and encoder/decoder circuitries and one or more antennas. The apparatus may in some embodiments further comprise a user interface enabling interaction with the user of the communication device. The user interface may comprise a display, a keypad or a keyboard, a loudspeaker, etc.

In an embodiment, the apparatus carrying out the embodiments of the invention in the wireless device comprises at least one processor 10 and at least one memory 20 including a computer program code 22, wherein the at least one memory and the computer program code are configured, with the at least one processor, to cause the apparatus to carry out the functionalities of the group owner according to any one of the embodiments of FIGS. 2 to 8. According to an aspect, when the at least one processor 10 executes the computer program code, the computer program code causes the apparatus to carry out the functionalities of the group owner according to any one of the embodiments of FIGS. 2 to 8. According to another embodiment, the apparatus carrying out the embodiments of the invention in the wireless device comprises the at least one processor 10 and at least one memory 20 including a computer program code 22, wherein the at least one processor 10 and the computer program code 22 perform the at least some of the functionalities of the group owner according to any one of the embodiments of FIGS. 2 to 8. Accordingly, the at least one processor, the memory, and the computer program code form processing means for carrying out embodiments of the present invention in the wireless device. According to yet another embodiment, the apparatus carrying out the embodiments of the invention in the wireless device comprises a circuitry including at least one processor 10 and at least one memory 20 including computer program code 22. When activated, the circuitry causes the apparatus to perform the at least some of the functionalities of the group owner according to any one of the embodiments of FIGS. 2 to 8.

Figure 10:
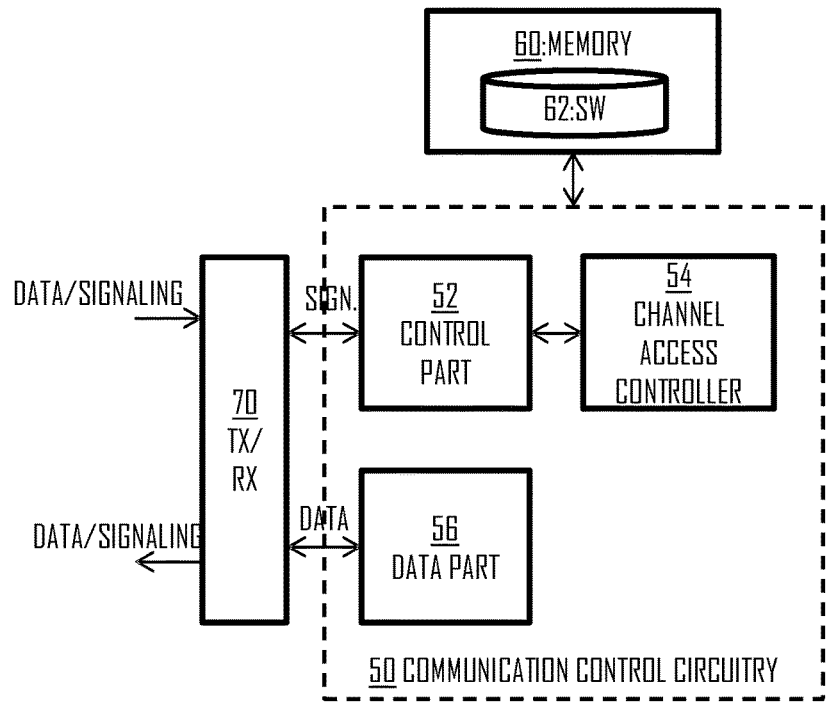

FIG. 10 illustrates another embodiment of an apparatus comprising means for carrying out the above-mentioned functionalities of the wireless device, e.g. the device 112, 114 operating as the terminal device in the wireless network of the group owner 110. The wireless device may comply with specifications of an IEEE 802.11 network and/or another wireless network, e.g. according to the Wi-Fi Direct specifications. The wireless device may also be a cognitive radio apparatus capable of adapting its operation to a changing radio environment, e.g. to changes in parameters of another system on the same frequency band. The wireless device may be or may be comprised in a computer (PC), a laptop, a tablet computer, a cellular phone, a palm computer, or any other apparatus provided with radio communication capability. In another embodiment, the apparatus carrying out the above-described functionalities of the wireless device is comprised in such a wireless device, e.g. the apparatus may comprise a circuitry, e.g. a chip, a chipset, a processor, a micro controller, or a combination of such circuitries in the wireless device.

Referring to FIG. 10, the apparatus may comprise a communication controller circuitry 50 configured to control wireless communications in the wireless device. The communication controller circuitry 50 may configure the establishment, operation, and termination of connections or associations in the apparatus, as described above. The communication controller circuitry 50 may comprise a control part 52 handling control signalling communication with respect to transmission, reception, and extraction of control or management frames including beacon messages, request messages, response messages, scanning or probing messages, request-to-send (RTS) messages, and clear-to-send (CTS) messages, broadcast messages, multicast messages, and unicast messages. The control part 52 may also carry out processing of headers of data frames. The communication controller circuitry 50 may further comprise a data part 56 that handles transmission and reception of payload data when the apparatus is associated to the group owner and/or another device.

The communication control circuitry 50 may further comprise a channel access controller 54 configured to control the channel access of the apparatus. The channel access controller 54 may, for example, select the power management mode of the wireless device and select the timings when the wireless device dozes, when the power management mode allows the dozing. The channel access controller 54 may receive the power management mode(s) from the group owner through the control part 52 and select one of the allowed power management mode(s). Then, the channel access controller 54 may control the channel access and operation of the wireless device according to the selected power management mode. For example, the channel access controller may choose whether or not to doze during the absence periods of the group owner. Upon choosing to doze, the channel access controller 54 may cause the control part 52, the data part 56, and other wireless transceiver circuitries of the wireless device to shut down. Upon choosing to wake up from the dozing before the absence period ends, the channel access controller 54 may activate the control part 52, the data part 56, and the other wireless transceiver circuitries of the wireless device.

The circuitries 52 to 56 of the communication controller circuitry 50 may be carried out by the one or more physical circuitries or processors. In practice, the different circuitries may be realized by different computer program modules.

Depending on the specifications and the design of the apparatus, the apparatus may comprise some of the circuitries 52 to 56 or all of them.

The apparatus may further comprise a memory 60 that stores computer programs (software) 62 configuring the apparatus to perform the above-described functionalities of the wireless device. The memory 60 may also store communication parameters and other information needed for the wireless communications. The memory 60 may store rules for the different power management modes, for example.

The apparatus may further comprise radio interface components 70 providing the apparatus with radio communication capabilities within one or more wireless networks. The radio interface components 70 may comprise standard well-known wireless transceiver circuitries comprising an amplifier, filter, frequency-converter, (de)modulator, and encoder/decoder circuitries and one or more antennas. The apparatus may in some embodiments further comprise a user interface enabling interaction with the user of the communication device. The user interface may comprise a display, a keypad or a keyboard, a loudspeaker, etc.

In an embodiment, the apparatus carrying out the embodiments of the invention in the wireless device comprises at least one processor 50 and at least one memory 60 including a computer program code 62, wherein the at least one memory and the computer program code are configured, with the at least one processor, to cause the apparatus to carry out the functionalities of the client device according to any one of the embodiments of FIGS. 2 to 8. According to an aspect, when the at least one processor 50 executes the computer program code, the computer program code causes the apparatus to carry out the functionalities of the client device according to any one of the embodiments of FIGS. 2 to 8. According to another embodiment, the apparatus carrying out the embodiments of the invention in the wireless device comprises the at least one processor 50 and at least one memory 60 including a computer program code 62, wherein the at least one processor 50 and the computer program code 62 perform the at least some of the functionalities of the client device according to any one of the embodiments of FIGS. 2 to 8. Accordingly, the at least one processor, the memory, and the computer program code form processing means for carrying out embodiments of the present invention in the wireless device. According to yet another embodiment, the apparatus carrying out the embodiments of the invention in the wireless device comprises a circuitry including at least one processor 50 and at least one memory 60 including computer program code 62. When activated, the circuitry causes the apparatus to perform the at least some of the functionalities of the client device according to any one of the embodiments of FIGS. 2 to 8.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

Figure 11:
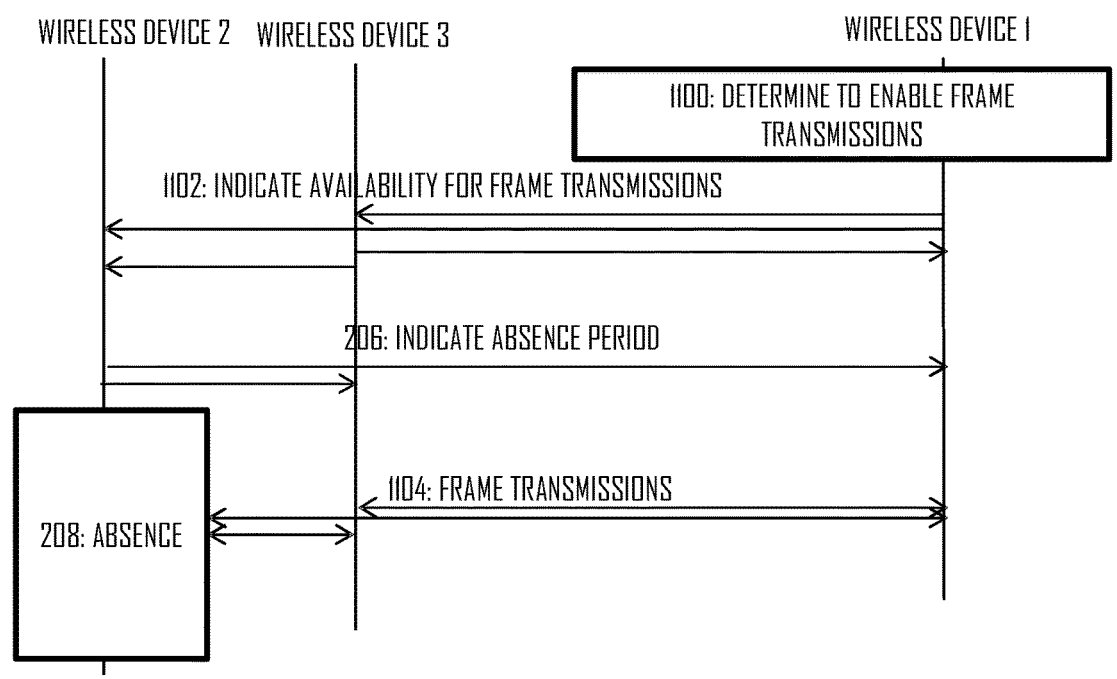
FIG. 11 illustrates a signalling diagram of another aspect where the client devices employ the absence period to carry out frame transmissions.

Another aspect is illustrated in FIG. 11. The notice of absence period 208 is basically an idle period for the client devices 112, 114, and they may choose whether or not to doze during the absence period 208, depending on whether or not the power management scheme allows the dozing. According to this aspect, the idle time provided by the absence period 208 may be used by the client devices 112, 114 to communicate with each other or even with the group owner, the latter in the case where the group owner is present in the wireless network of the devices 112, 114 during the absence period 208. FIG. 11 illustrates a process, executed by the client device, for indicating availability for frame transmissions during the absence period. Referring to FIG. 11, a first apparatus determines whether or not to enable frame transmissions during the absence periods (block 1100). Upon determining to enable the frame transmissions, the first apparatus causes transmission of a frame indicating that the first apparatus is available for frame transmissions during the absence periods (block 1102). The frame may be addressed to the second apparatus (e.g. the group owner), to a third apparatus (e.g. another client device), or to a broadcast address.

In step 206, the first apparatus receives from a second apparatus an indication of an absence period. A third apparatus may also have received the indication of the absence period from the second apparatus and the indication of the availability during the absence periods from the first apparatus. It may also have indicated its availability during the absence periods in step 1102. As the apparatuses are aware of each other's availability during the absence periods, the apparatuses may initiate frame transmissions during the absence period 208 (step 1104). For example, the third apparatus and the first apparatus may initiate frame transmissions with each other. In a similar manner, the second apparatus initiating the absence period but being present in the wireless network and may have received the indication of the availability from the first apparatus and/or the second apparatus, and initiate frame transmissions with the first apparatus and/or the second apparatus during the absence period 208. The frame transmissions may be carried out in the conventional manner, e.g. through channel contention.

The second apparatus may be the group owner and the first apparatus and the third apparatus client devices. The client devices may transmit the indication of the availability in an association request frame, a reassociation request frame, a wireless network management (WNM) notification message, or a notice-of-absence response frame. The same frames may be used to tear down or change the availability for frame transmissions during the absence periods. It may be voluntary for the client device to indicate its availability, so the client device may make an autonomous decision of whether or not to enable the frame transmissions during the absence periods. As shown in connection with FIG. 11, the notification of the availability for the frame transmissions may be a semi-static state which spans over a plurality of absence periods.

In one embodiment, the group owner may indicate to the client devices that it will be available during the absence periods for a transmission with specified one or more client devices or with all client devices. The group owner may use the same frames for signaling as the client devices.

In the embodiment of FIG. 11, each apparatus autonomously indicates the availability for frame transmissions. In another embodiment, an apparatus may request another apparatus to be available for frame transmissions during the absence period frame. The other apparatus may determine, upon receiving a frame carrying the request, whether or not it approves the request, and send a response frame in which it indicates the decision.

The apparatus may choose to transmit the indication or the request for the availability for frame transmissions if at least one of the following criteria is satisfied: the channel is congested and frames transmission may require more transmission time than available or that can be easily obtained; there are high number of transmission errors and/or a lot of retransmissions are needed; the transmitted traffic contains bursts and the number of transmitted octets varies significantly; the transmitted traffic is created in random intervals and has random payloads; the apparatus is operating with multiple radio connections and the apparatus cannot estimate reliably when it is possible to transmit in the wireless network of the group owner; the group owner has set notice-of-absence periodicity so high that there is not enough transmission time between the absence periods for the client device to transmit all the traffic to group owner; the apparatus or the requested client device is detected or assumed to be mains powered and could support the operation according to the request.

A frame carrying the indication of the availability for frame transmissions in step 1102 may comprise the following field called Optimized Availability field:

TABLE 1

| Availability | Post-awake period |
|---|---|
| 4 bits | 12 bits |

The Availability field may indicate an availability mode of the apparatus that transmitted the frame. A first value may indicate that the apparatus is available according to the power-save signaling in the wireless network. This may be a default mode and the operating mode, if the Optimized Availability field is not present. A second value may indicate that the apparatus is available during the absence period to receive frames, if a header of a protocol packet data unit (PPDU) has started before the absence period 208. The protocol may be a physical layer convergence protocol (PLOP) of the 802.11 networks. A third value may indicate that the apparatus is available for a determined time interval after the termination of a service period that precedes the absence period or after the start of the absence period 208. The determined time interval may be specified by a value of the post-awake period of Table 1. A fourth value may indicate that the apparatus is available for the determined time interval after the beginning of the absence period or after the termination of the service period preceding, but no new service period may be started. The apparatus may indicate with this value that it will not transmit frames to another apparatus that transmits frames during the post-awake period. A fifth value may indicate that the terminal device is available for the post-awake period and frames received during the post-awake period trigger a service period with the apparatus. If the triggering is performed during the post-awake time following the notice-of-absence indication, then the absence period is cancelled between the two devices. Referring to FIG. 11, if the second apparatus that initiated the absence period trigger a service period with the first apparatus during the absence period, the first apparatus and the second apparatus may consider the absence period cancelled, but the third apparatus may assume the absence period 208 is still running. If the triggering is carried out during the post-awake period counted from the end of a service period, a new service period is initiated between the apparatuses. A sixth value may indicate that the apparatus is available regardless of the used power save mechanisms.

The post-awake period may define the duration in units of 40 microseconds that the apparatus will be available for the frame transmissions, when the Availability field the determined time interval.

Steps of the process of FIG. 11 carried out by the second apparatus may be carried out in the apparatus of FIG. 9 described above. The apparatus implementing the features of FIG. 11 may carry out the above-described embodiments related to the selection of the allowable power management modes or, in other embodiments, the apparatus may omit those features. Accordingly, the second apparatus may comprise or may be provided without the power management mode controller 18. Steps of the process of FIG. 11 carried out by the first apparatus or the third apparatus may be carried out in the apparatus of FIG. 10 described above. The apparatus implementing the features of the first apparatus or the third apparatus may carry out the above-described embodiments related to the operation according to the allowable power management modes specified by the group owner or, in other embodiments, the apparatus may omit those features.

The processes or methods described in FIGS. 2 to 8 and 11 may also be carried out in the form of one or more computer processes defined by one or more computer program. A separate computer program may be provided in each apparatus that executes functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
  receiving, by a first apparatus, a first frame from a second apparatus, wherein the first frame indicates at least one allowable power management mode the first apparatus is allowed to use, wherein the at least one allowable power management mode comprises at least one of the following power management modes of a wireless local area network: an active mode, a power-save mode, and a power-save mode according to unscheduled automatic power-save delivery mechanism;
  receiving, by the first apparatus from the second apparatus, an indication of an absence period during which it is not possible to transfer frames between the first apparatus and the second apparatus, wherein the indication is received in the first frame;
  causing the first apparatus to be ready to communicate with the second apparatus at the end of the absence period in a case where the at least one allowable power management mode indicates a first power management mode.

2. The method of claim 1, wherein the first power management mode is one of the following modes: an active mode where the first apparatus stays ready to communicate with the second apparatus for the duration of the absence period, and power-save mode where the first apparatus enters a doze state during the absence period but awakes before the end of the absence period.

3. The method of claim 1, wherein the first frame comprises a notice-of-absence frame.

4. The method of claim 1, wherein the first apparatus is a client device of a wireless local area network, and the second apparatus is a group owner of the wireless local area network, and wherein the client device and the group owner are configured to connect with each other directly without using an access node.

5. The method of claim 1, further comprising in the first apparatus when the absence period ends: initiating frame transmissions to the second apparatus only upon receiving a second frame from the second apparatus.

6. A method comprising:
  determining, in a first apparatus, at least one allowable power management mode at least a second apparatus is allowed to use, wherein the at least one allowable power management mode comprises at least one of the following power management modes of a wireless local area network: an active mode, a power-save mode, and a power-save mode according to unscheduled automatic power-save delivery mechanism;
  causing, by the first apparatus to the second apparatus, transmission of a first frame indicating the at least one allowable power management mode;
  causing, by the first apparatus, transmission of an indication of an absence period during which it is not possible to transfer frames with the first apparatus, wherein the indication is provided in the first frame,
  wherein the first frame configures at least the second apparatus to be ready to communicate with the first apparatus at the end of the absence period in a case where the at least one allowable power management mode indicates a first power management mode.

7. The method of claim 6, wherein the first power management mode is one of the following modes: an active mode where the second apparatus is configured to stay ready to communicate with the first apparatus for the duration of the absence period, and a power-save mode where the second apparatus is allowed to enter a doze state during the absence period but awake before the end of the absence period.

8. The method of claim 6, wherein the first frame comprises a notice-of-absence frame.

9. The method of claim 6, wherein the first apparatus is a group owner of a wireless local area network and the second apparatus is a client device of the wireless local area network, and wherein the client device and the group owner are configured to connect with each other directly without using an access node.

10. The method of claim 6, further comprising in the first apparatus: determining the at least one allowable power management mode on the basis of characteristics of data traffic between the first apparatus and at least the second apparatus.

11. An apparatus comprising:
   at least one processor; and
   at least one memory including computer program code, wherein the at least one memory and the computer program code are configured, with the at least one processor, to cause the apparatus to:
   receive a first frame from a second apparatus, wherein the first frame indicates at least one allowable power management mode the apparatus is allowed to use, wherein the at least one allowable power management mode comprises at least one of the following power management modes of a wireless local area network: an active mode, a power-save mode, and a power-save mode according to unscheduled automatic power-save delivery mechanism;
   receive, by the apparatus from the second apparatus, an indication of an absence period during which it is not possible to transfer frames between the apparatus and the second apparatus, wherein the indication is received in the first frame; and
   cause the apparatus to be ready to communicate with the second apparatus at the end of the absence period in a case where the at least one allowable power management mode indicates a first power management mode.

12. The apparatus of claim 11, wherein the first power management mode is one of the following modes: an active mode where, when applied, the at least one memory and the computer program code are configured, with the at least one processor, to cause the apparatus to stay ready to communicate with the second apparatus for the duration of the absence period, and a power-save mode where, when applied, the at least one memory and the computer program code are configured, with the at least one processor, to cause the apparatus to enter a doze state during the absence period but awakes before the end of the absence period.

13. The apparatus of claim 11, wherein the first frame comprises a notice-of-absence frame.

14. The apparatus of claim 11, wherein the apparatus is a client device of a wireless local area network, and the second apparatus is a group owner of the wireless local area network, and wherein the client device and the group owner are configured to connect with each other directly without using an access node.

15. The apparatus of claim 11, wherein the at least one memory and the computer program code are configured, with the at least one processor, to cause the apparatus to initiate, when the absence period ends, frame transmissions to the second apparatus only upon receiving a second frame from the second apparatus.

16. An apparatus comprising:
   at least one processor; and
   at least one memory including computer program code, wherein the at least one memory and the computer program code are configured, with the at least one processor, to cause the apparatus to:
   determine at least one allowable power management mode at least a second apparatus is allowed to use, wherein the at least one allowable power management mode comprises at least one of the following power management modes of a wireless local area network: an active mode, a power-save mode, and a power-save mode according to unscheduled automatic power-save delivery mechanism;
   cause, by the apparatus to the second apparatus, transmission of a first frame indicating the at least one allowable power management mode; and
   cause transmission of an indication of an absence period during which it is not possible to transfer frames with the apparatus, wherein the indication is provided in the first frame,
   wherein the first frame configures at least the second apparatus to be ready to communicate with the apparatus at the end of the absence period in a case where the at least one allowable power management mode indicates a first power management mode.

17. The apparatus of claim 16, wherein the first power management mode is one of the following modes: an active mode where the second apparatus is configured to stay ready to communicate with the apparatus for the duration of the absence period, and a power-save mode where the second apparatus is allowed to enter a doze state during the absence period but awake before the end of the absence period.

18. The apparatus of claim 16, wherein the first frame comprises a notice-of-absence frame.

19. The apparatus of claim 16, wherein the apparatus is a group owner of a wireless local area network and the second apparatus is a client device of the wireless local area network, and wherein the client device and the group owner are configured to connect with each other directly without using an access node.

20. The apparatus of claim 16, wherein the at least one memory and the computer program code are configured, with the at least one processor, to cause the apparatus to determine the at least one allowable power management mode on the basis of characteristics of data traffic between the apparatus and at least the second apparatus.

* * * * *